(12) United States Patent
Schmidt et al.

(10) Patent No.: US 11,215,588 B2
(45) Date of Patent: Jan. 4, 2022

(54) FLUID PRESSURE CONTROL APPARATUS AND SYSTEM

(71) Applicant: Siemens Aktiengesellschaft, Munich (DE)

(72) Inventors: Glen Eugene Schmidt, Bartlesville, OK (US); Kurt Bottorff, Bartlesville, OK (US)

(73) Assignee: Siemens Aktiengesellschaft, Munich (DE)

( * ) Notice: Subject to any disclaimer, the term of this patent is extended or adjusted under 35 U.S.C. 154(b) by 289 days.

(21) Appl. No.: 16/579,315

(22) Filed: Sep. 23, 2019

(65) Prior Publication Data
US 2020/0096487 A1 Mar. 26, 2020

(30) Foreign Application Priority Data
Sep. 24, 2018 (EP) ...................................... 8196354

(51) Int. Cl.
*G01N 30/32* (2006.01)
*G05D 16/20* (2006.01)
*G01N 30/02* (2006.01)

(52) U.S. Cl.
CPC .......... *G01N 30/32* (2013.01); *G05D 16/2022* (2019.01); *B01L 2400/0666* (2013.01); *G01N 2030/025* (2013.01); *G01N 2030/328* (2013.01)

(58) Field of Classification Search
CPC ............. G01N 30/32; G01N 2030/025; G01N 2030/328; F16K 31/06–0696; B01L 2400/0666; G05D 16/2013; G05D 16/2022; G05D 16/2024; G05D 16/206
See application file for complete search history.

(56) References Cited

U.S. PATENT DOCUMENTS 2,427,970 A  *  9/1947  Mathys .................... B23Q 5/26
                                                           60/383
9,568,095 B2      2/2017  Eglinger et al.
2012/0103063 A1   5/2012  Bushey et al.

FOREIGN PATENT DOCUMENTS

DE          3318821          11/1984

* cited by examiner

*Primary Examiner* — Justin N Olamit
(74) *Attorney, Agent, or Firm* — Cozen O'Connor

(57) ABSTRACT

A fluid pressure control apparatus includes a proportional solenoid valve operatively connected between a fluid inlet and a fluid outlet and a pressure sensor fluidically coupled to the fluid outlet, wherein an electronic controller generates and outputs a control signal to the solenoid valve in dependence on a first signal from the pressure sensor and a second signal corresponding to a pressure set point, where the solenoid valve has a rest position between opened and closed, and the electronic controller is further adapted to generate the control signal with either of opposite polarities to move the valve in either of opposite directions from its rest position in order to reduce power consumption and heat generation, in particular for use in gas analysis equipment located in hazardous areas.

12 Claims, 2 Drawing Sheets

FLUID PRESSURE CONTROL APPARATUS AND SYSTEM

BACKGROUND OF THE INVENTION

1. Field of the Invention

The invention relates to a fluid pressure control apparatus and further relates to a fluid pressure control system comprising at least two of such fluid pressure control apparatuses.

2. Description of the Related Art

The fluid pressure control apparatus of concern herein provides a regulated fluid pressure output that is equal to a pressure set point value applied to the control apparatus. To that end, the apparatus may comprise a proportional solenoid valve operatively connected between a fluid inlet and a fluid outlet and a pressure sensor fluidically coupled to the fluid outlet. An electronic controller generates and outputs a control signal to the solenoid valve in dependence on a control deviation between the measured or sensed pressure and the pressure set point value.

The mentioned pressure apparatuses or systems may be used in gas analysis equipment, for example, for regulating a carrier gas flow in a process gas chromatograph. Gas analysis equipment is often located in harsh environment, where explosive gases may be present. Thus, safety precautions must be taken to prevent the gases from igniting. To that end, the one or more control apparatuses may be arranged in a pressurized enclosure that uses overpressure to prevent an explosive atmosphere from entering. The overpressure may be maintained by continuous purging, which can be costly.

In flameproof enclosure protection, an explosion occurring inside the enclosure is prevented from spreading and igniting the explosive atmosphere surrounding the enclosure. This, however, leads to very robust and expensive housings and furthermore to poor dissipation of heat generated by the fluid pressure control apparatuses inside the housing.

In intrinsic safety protection, the current and voltage are limited to such an extent that no spark or thermal effect can cause an explosive atmosphere to ignite. There are various intrinsic safety standards set forth by various certifying agencies including International Electrical Commission (IEC) IEC 60079-11, Factory Mutual (FM) 3610, and/or Underwriters Laboratories (UL) UL913.

The solenoid valve of the fluid pressure control apparatus is an electromechanical device in which the solenoid (electric coil) uses an electric current to generate a magnetic field and thereby operate a valve member. Standard solenoid valves require a not insignificant amount of electrical power to move the valve member (disc) against a spring loading from the valve seat (closed position) to a more or less open position and hold the valve member in the open position. This holds in particular, when the solenoid valve is not only used as a proportional valve but also to safely shut off the gas flow when de-energized. Here, the spring load will be set to a higher value, thus requiring even more power to both open the valve and keep it open.

SUMMARY OF THE INVENTION

In view of the foregoing, it is therefore an object of the present invention to provide a fluid pressure control apparatus and system with reduced power consumption and heat generation, in particular for use in gas analysis equipment located in hazardous areas where explosive gas or dust might be present.

This and other objects and advantages are achieved in accordance with the invention by a fluid pressure control apparatus, a fluid pressure control system or gas chromatographs, where the fluid pressure control apparatus comprises a proportional solenoid valve operatively connected between a fluid inlet and a fluid outlet, a pressure sensor fluidically coupled to the fluid outlet, an electronic controller structured to receive a first signal from the pressure sensor, to receive a second signal corresponding to a pressure set point and to generate and output a control signal to the solenoid valve, where the said solenoid valve has a rest position between opened and closed and the electronic controller is further structured to generate the control signal with either of opposite polarities to move the valve in either of opposite directions from its rest position.

Further embodiments of the invention are set forth in the remaining claims.

It is also an object of the invention to provide a fluid pressure control system comprising at least two of such fluid pressure control apparatuses, where the fluid inlets of the pressure control apparatuses are fluidically connected and wherein an on-off solenoid valve is operatively arranged upstream of the fluid inlets.

It is a further object of the invention to provide a gas chromatograph comprising at least one fluid pressure control apparatus or system.

Assuming that in a standard solenoid valve about 60% of the maximum control power is needed to release the valve member from the seat, the electrical power for controlling the valve in the range between the closed and fully open positions will be between 60% and 100% of the maximum control power. In accordance with the invention, however, the solenoid valve has its rest or neutral position between fully opened and closed and is controlled with a signal having one or the other of two polarities, i.e., a positive or negative voltage or current. Therefore, if the rest position is in the middle between the outer positions, then the valve needs only about 20% of the power required by the mentioned standard valve for moving into either the closed or fully open position. In order to safely shut off the valve in, e.g., the case of an emergency, an additional but low percentage of power may be needed to press the valve member with a predetermined minimum force in the seat. To this end, the rest position may be slightly shifted from the exact middle towards the closed position.

One advantage of the invention is that, with less power consumption, less heat will produced by the solenoid valve. Another advantage is that the solenoid (coil) may be much smaller, thus reducing the inductance. Both factors significantly contribute to designing the fluid pressure control apparatus such that it meets prescribed intrinsic safety standards.

Any intrinsically safe electrical device in a hazardous area must be supplied from an intrinsic safety barrier that limits the current, voltage and total energy delivered to the device. As the power requirement of the solenoid valve of the fluid pressure control apparatus in accordance with the invention can amount to just 20% of that of the standard valve, as many as five control apparatuses can be connected to one intrinsic safety barrier opposed to only one previous control apparatus.

This advantageously allows for arranging two or more fluid pressure control apparatuses in a fluid pressure control system for individually controlled delivery of a fluid from a single source to different points of use, e.g., in a process gas chromatograph with a multi-column system. To this end, the fluid inlets of the different pressure control apparatuses are fluidically connected to the fluid source, with, advantageously, an on-off solenoid valve operatively arranged between the fluid source and the fluid inlets of the pressure control apparatuses. Thus, while the proportional solenoid valves are allowed to leak, the on-off solenoid valve ensures a safe shut off flow, e.g., at power off in case of emergency or during times of calibration, when no fluid is allowed to flow. As an on-off valve is much simpler in design and uses much less power than a proportional valve, it is very beneficial to shift the shut off function from the proportional valves to the single on-off valve.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will now be described by way of example and with reference to the accompanying drawing, in which.

DETAILED DESCRIPTION OF THE EXEMPLARY EMBODIMENTS

Figure 1:
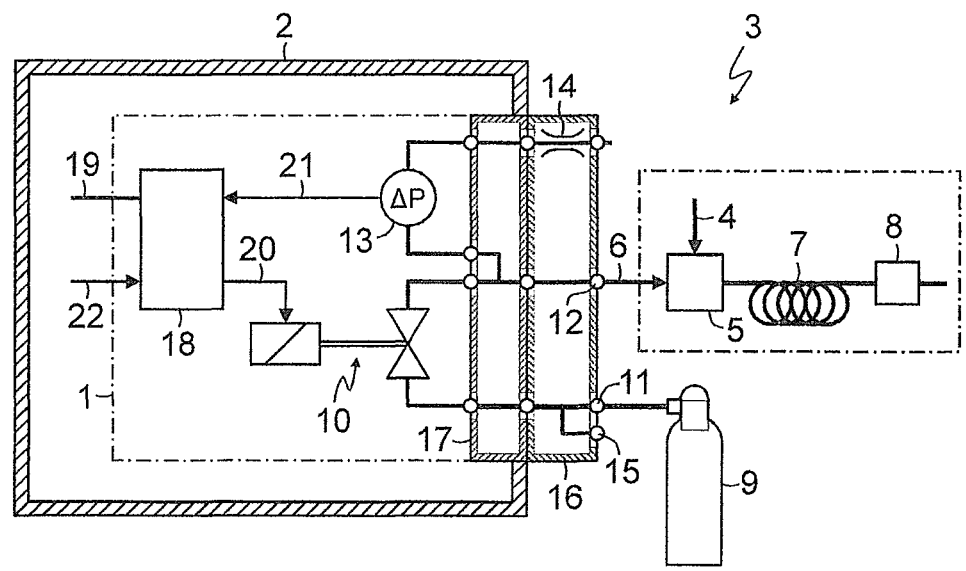
FIG. 1 is a simplified schematic block diagram of an exemplary fluid pressure control apparatus in accordance with the invention.

FIG. 1 illustrates a fluid pressure control apparatus 1 that is arranged in an electronics housing 2 of, e.g., a process gas chromatograph 3 for analyzing a gas mixture 4. A sample of the gas mixture 4 is supplied to a dosing unit 5 for injecting a specified dose of the gas sample into a carrier gas stream 6 (such as nitrogen or helium). The carrier gas 6 carries the sample through one or several separation columns 7 where separation of the components of the gas mixture 4 occurs. The gas components successively eluting from the column 7 are detected and quantitatively identified by a detector 8.

The carrier gas 6 is taken from a gas source 9, such as a gas bottle. The fluid pressure control apparatus 1 serves to maintain the pressure of the carrier gas 6 delivered to the column 7 at a predetermined level to provide an optimum performance over the column setpoint ranges. The pressure control apparatus 1 contains a proportional solenoid valve 10 that is operatively connected between a fluid inlet 11 to which the gas source 9 is connected and a fluid outlet 12 to which the dosing unit 5 is connected. A pressure sensor 13 measures the pressure of the carrier gas 6 at the fluid outlet 12 against the atmospheric pressure. To that end, the pressure sensor 13 is fluidically coupled to the fluid outlet 12, on one side, and via a flame arrester 14 to the surrounding atmosphere, on the other side. The fluid inlet 11 is in fluid communication with an additional fluid port 15 that allows connection of the fluid inlet of a second fluid pressure control apparatus (not shown) to the gas source 9. In the illustrated example, the fluid inlet 11, fluid outlet 12 and the additional fluid port 15 are realized as tube fittings on a connection manifold 16 that also contains the flame arrester 14. The pressure control apparatus 1 comprises a fluid interface 17 in the form of another manifold that provides fluidic connection between the valve 10 and the pressure sensor 13 and to the connection manifold 16.

The pressure control apparatus 1 further contains an electronic controller 18 that is powered via a line 19 and that generates and outputs a control signal 20 to the proportional solenoid valve 10 in dependence on a control deviation between a first signal 21 provided by the pressure sensor 13 and representative of the measured or sensed pressure and a pressure set point value 22.

Figure 2:
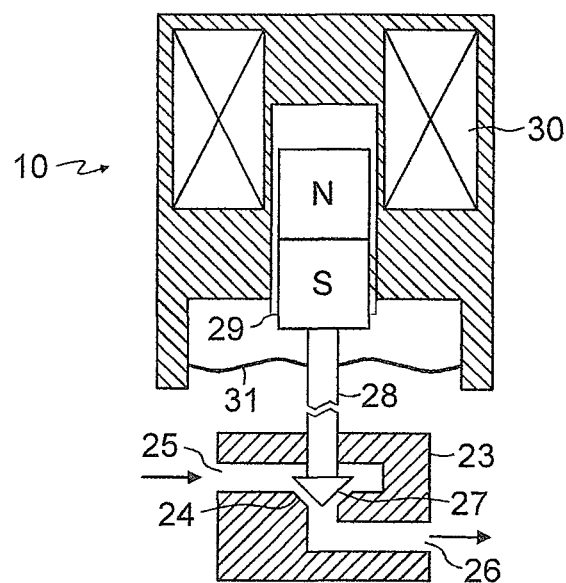
FIG. 2 is an exemplary embodiment of the proportional solenoid valve in accordance with the invention.

FIG. 2 shows a schematic illustration of an embodiment of the proportional solenoid valve 10. The valve 10 comprises a valve housing 23 including therein a valve seat 24, fluid supply and discharge passages 25, 26 and on both sides of the valve seat 24, the fluid inlet 11 (FIG. 1) connected to the fluid supply passage 25 and the fluid outlet 12 connected to the fluid discharge passage 26. In the housing 11, moreover, a valve member 27 at one end of a plunger 28 is disposed to engage with and disengage from the valve seat 24. A permanent magnet 29 at the other end of the plunger 28 is arranged to be laterally movable in a gap of a solenoid 30. A spring element 31 holds the plunger 28 in a rest position, where the valve member 27 is situated somewhere in between, preferably in the middle between the closed position and the full open position of the valve 10. Depending on the polarity of a voltage or current applied to the solenoid, the permanent magnet is either pulled-in towards the solenoid 10, or pushed-out from it.

Referring back to FIG. 1, the electronic controller 18 is adapted to generate the control signal 20 with either of opposite polarities, i.e., a positive or negative voltage or current, in order to move the valve member 27 in either of opposite directions from its rest position.

Figure 3:
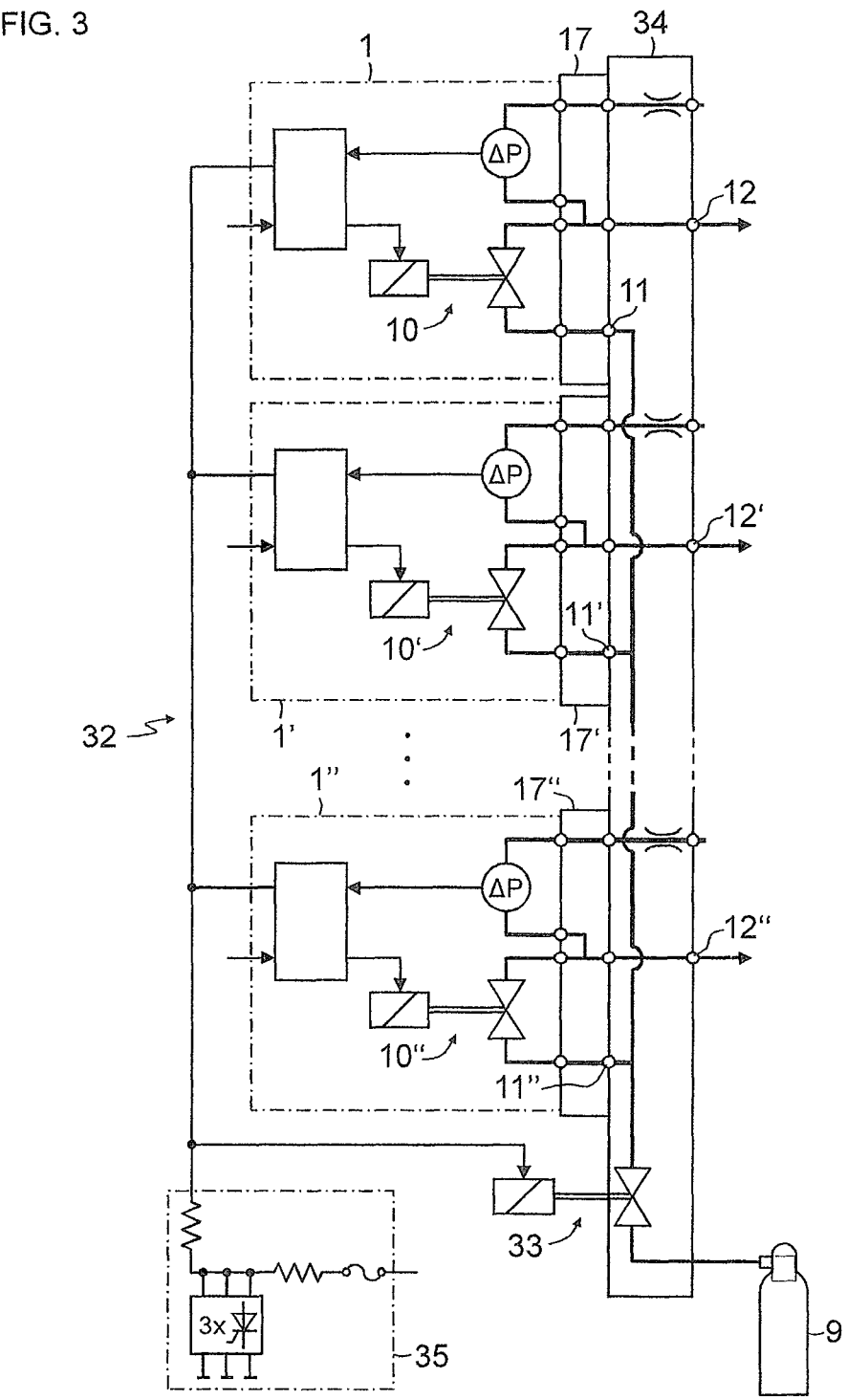
FIG. 3 is a simplified schematic block diagram of an exemplary fluid pressure control system in accordance with the invention.

FIG. 3 illustrates a simplified schematic block diagram of an exemplary fluid pressure control system 32 comprising several identical fluid pressure control apparatuses 1, 1', 1" and an on-off solenoid valve 33. In contrast to the example shown in FIG. 1, the connection manifold 34 is formed as a single part to connect all pressure control apparatuses 1, 1', 1" at their respective fluid inlets 11 through the on-off solenoid valve 33 to the fluid source 9, here the gas bottle. The pressure control apparatuses 1, 1', 1" individually control delivery of the carrier gas 6 to different points of use in the process gas chromatograph.

The fluid pressure control apparatuses 1, 1', 1" and the on-off solenoid valve 33 are each intrinsically safe and are commonly powered via an intrinsic safety barrier 35 that limits the current, voltage and total energy delivered to them.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A fluid pressure control apparatus comprising:
a proportional solenoid valve operatively connected between a fluid inlet and a fluid outlet;
a pressure sensor fluidically coupled to the fluid outlet; and
an electronic controller configured to receive a first signal from the pressure sensor, receive a second signal corresponding to a pressure set point and to generate and output a control signal to the proportional solenoid valve;
wherein the proportional solenoid valve has a rest position between fully opened and closed; and
wherein the electronic controller is further configured to generate the control signal with either of opposite polarities to move the proportional solenoid valve in either of opposite directions from the rest position of the proportional solenoid valve.

2. The fluid pressure control apparatus of claim 1, wherein the fluid pressure control apparatus complies with an intrinsic safety standard.

3. The fluid pressure control apparatus of claim 2, wherein the intrinsic safety standard is International Electrical Commission (IEC) standard 60079-11.

4. A fluid pressure control system comprising at least two fluid pressure control apparatuses as claimed in claim 1, wherein each respective fluid inlet of the at least two fluid pressure control apparatuses is fluidically interconnected; and wherein an on-off solenoid valve is operatively arranged upstream of each respective fluid inlet.

5. The fluid pressure control system of claim 4, wherein the on-off solenoid valve is configured to be driven at a low power that complies with an intrinsic safety standard.

6. The fluid pressure control system of claim 5, wherein the intrinsic safety standard is International Electrical Commission (IEC) standard 60079-11.

7. A gas chromatograph comprising at least one fluid pressure control apparatus of claim 1.

8. A gas chromatograph comprising at least one fluid pressure control apparatus of claim 2.

9. A gas chromatograph comprising at least one fluid pressure control apparatus of claim 3.

10. A gas chromatograph comprising at least one fluid pressure control system of claim 4.

11. A gas chromatograph comprising at least one fluid pressure control system of claim 5.

12. A gas chromatograph comprising at least one fluid pressure control system of claim 6.

* * * * *